(No Model.) 7 Sheets—Sheet 3.

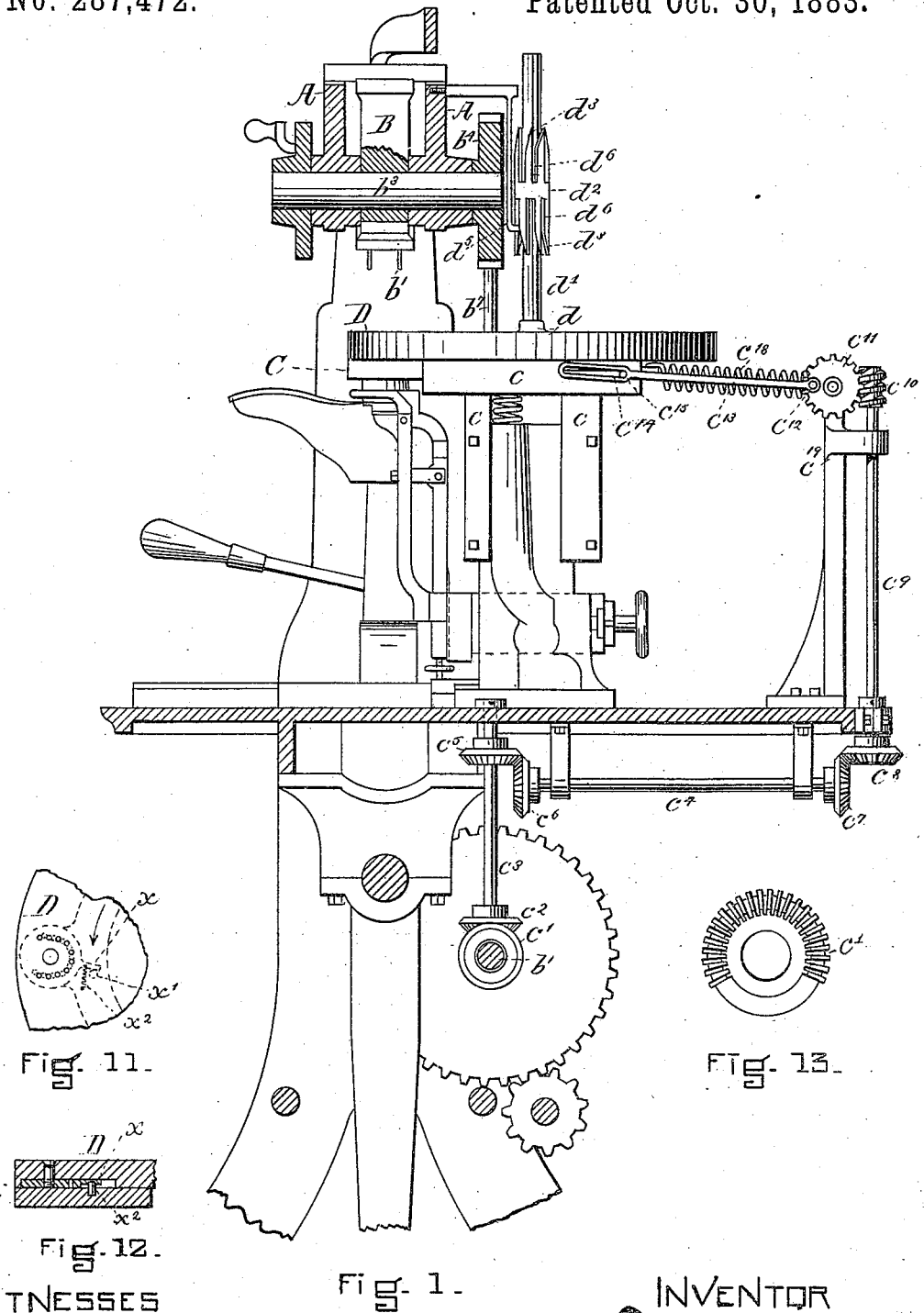

F. F. RAYMOND, 2d.
HEEL NAILING MACHINE.

No. 287,472. Patented Oct. 30, 1883.

WITNESSES

INVENTOR (No Model.)

7 Sheets—Sheet 4.

F. F. RAYMOND, 2d.
HEEL NAILING MACHINE.

No. 287,472.                Patented Oct. 30, 1883.

WITNESSES
Fred Harris
William J. Healey

INVENTOR
F. F. Raymond 2d (No Model.) 7 Sheets—Sheet 5.

F. F. RAYMOND, 2d.
HEEL NAILING MACHINE.

No. 287,472. Patented Oct. 30, 1883.

WITNESSES

INVENTOR (No Model.)
7 Sheets—Sheet 6.
F. F. RAYMOND, 2d.
HEEL NAILING MACHINE.
No. 287,472.
Patented Oct. 30, 1883.
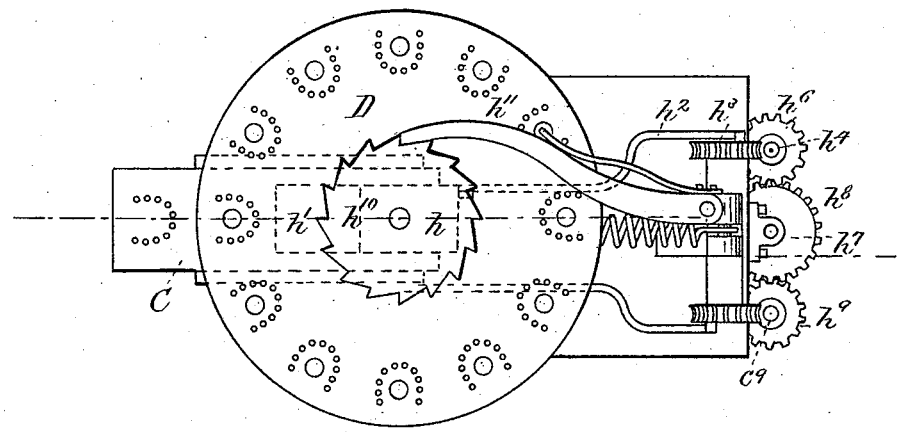
Fig-9-
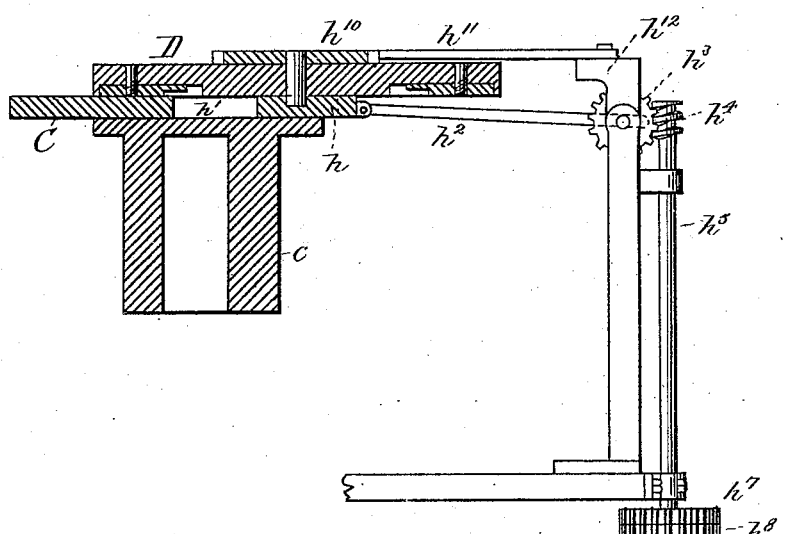
Fig-10-
WITNESSES
INVENTOR (No Model.)

F. F. RAYMOND, 2d.
HEEL NAILING MACHINE.

No. 287,472. Patented Oct. 30, 1883.

7 Sheets—Sheet 7.

WITNESSES

INVENTOR

United States Patent Office.

FREEBORN F. RAYMOND, 2D, OF NEWTON, MASSACHUSETTS.

HEEL-NAILING MACHINE.

SPECIFICATION forming part of Letters Patent No. 287,472, dated October 30, 1883.

Application filed June 30, 1883. (No model.)

*To all whom it may concern:*

Be it known that I, FREEBORN F. RAYMOND, 2d, of Newton, in the county of Middlesex and State of Massachusetts, a citizen of the United States, have invented a certain new and useful Improvement in Heel-Nailing Machines, of which the following is a full, clear, and exact description, reference being had to the accompanying drawings, forming a part of this specification, in explaining its nature, in which—

Figure 2:
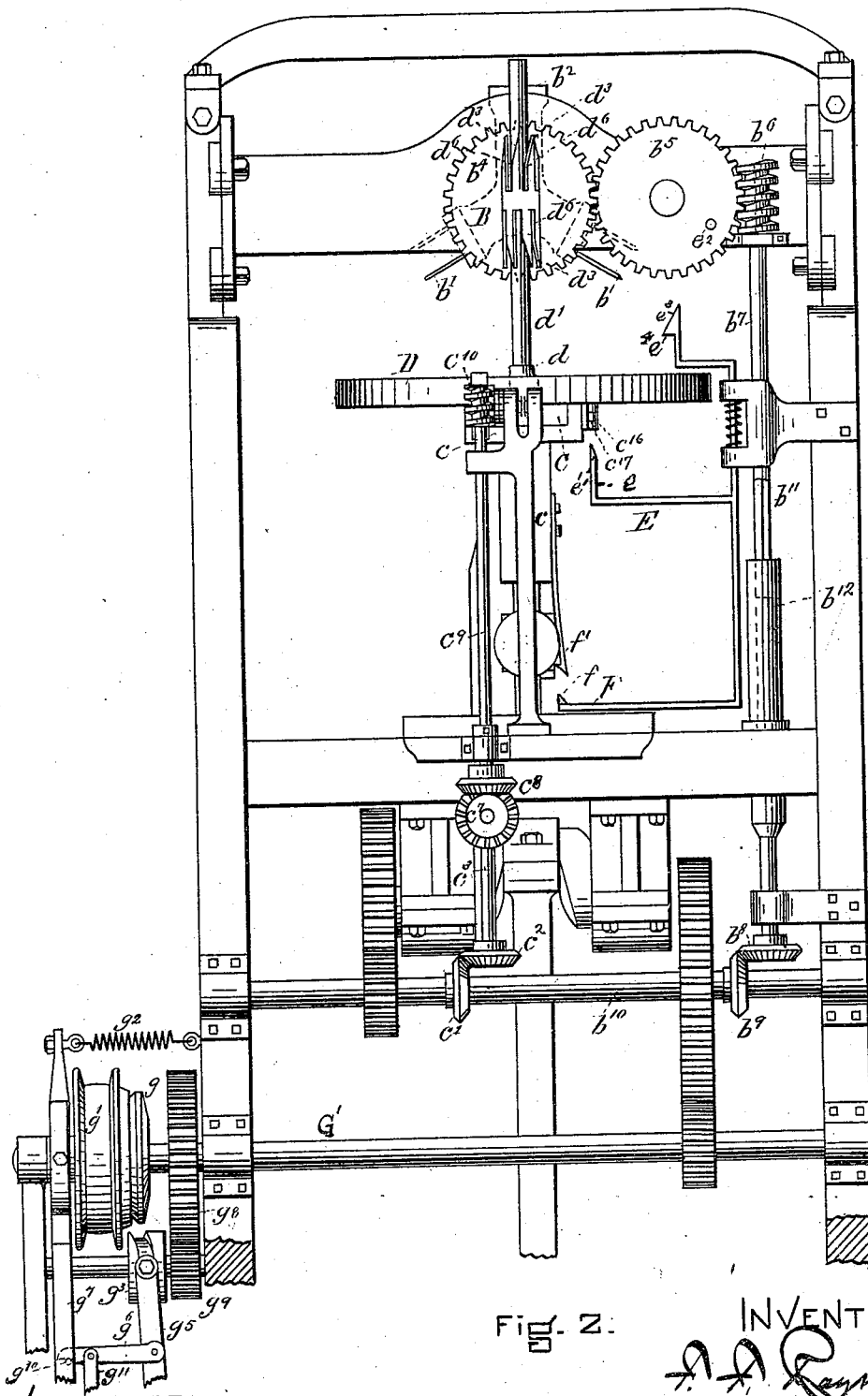
Figure 3:
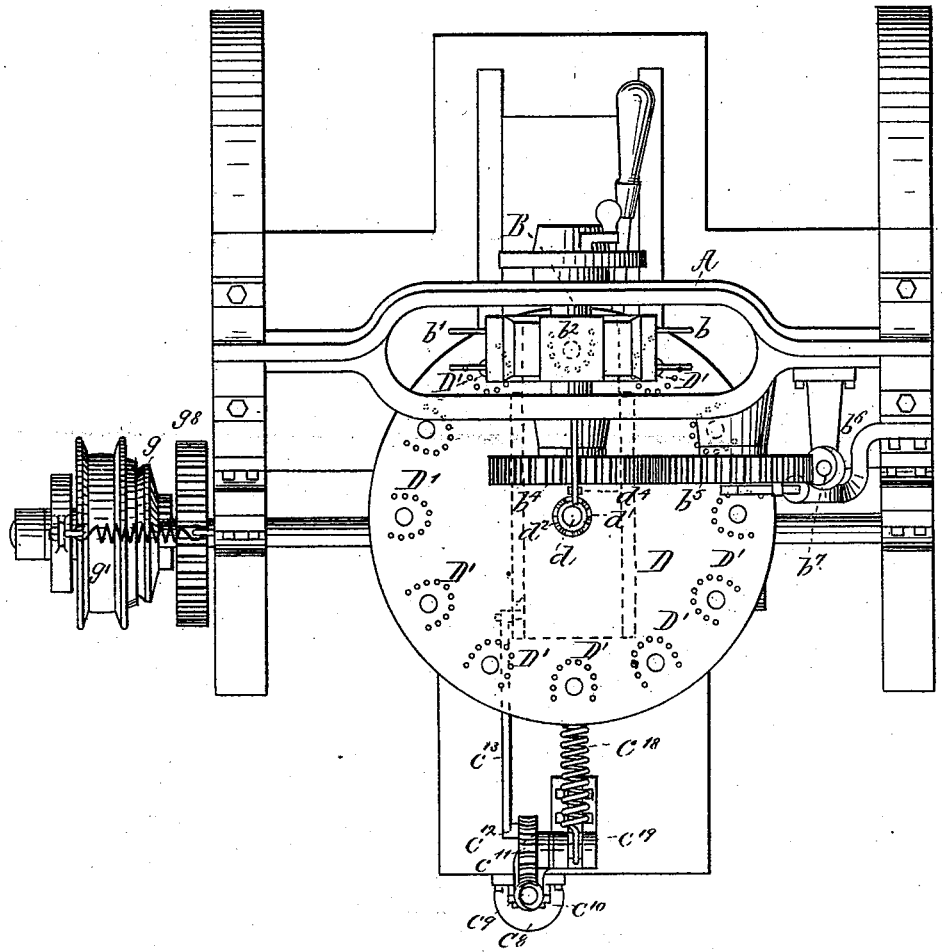
Figure 4:
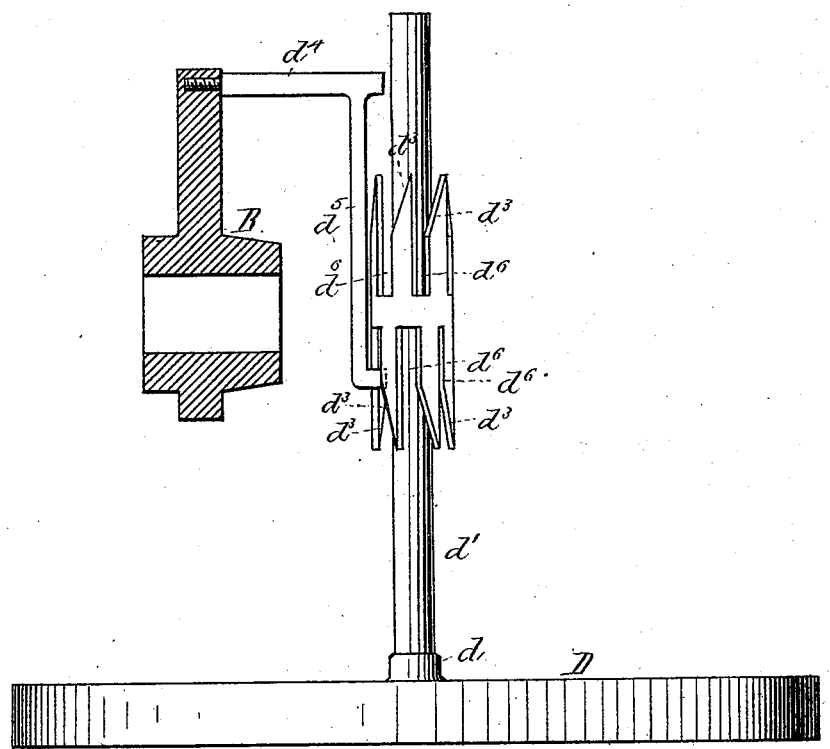
Figure 5:
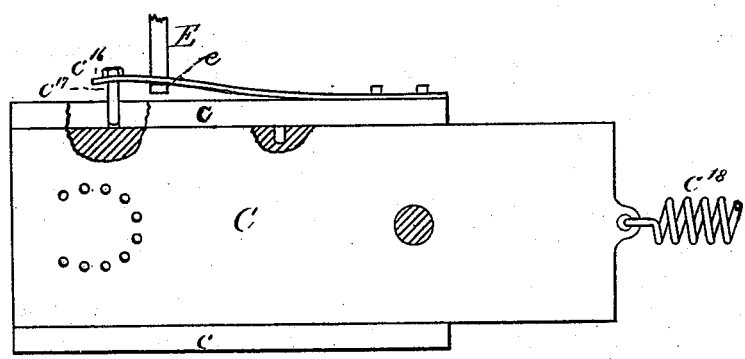
Figure 6:
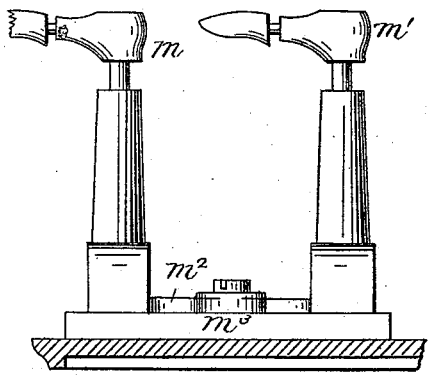
Figure 7:
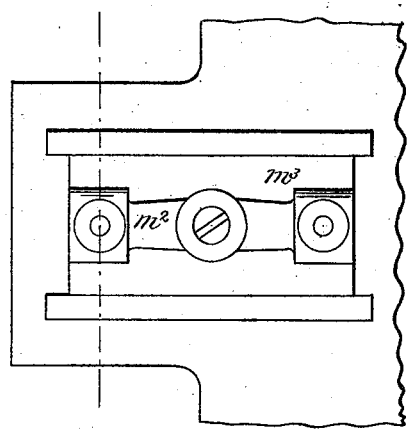
Figure 8:
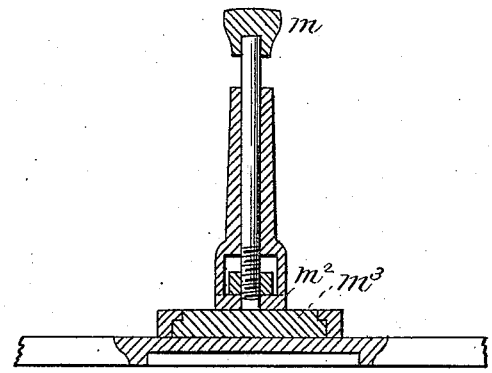
Figure 14:
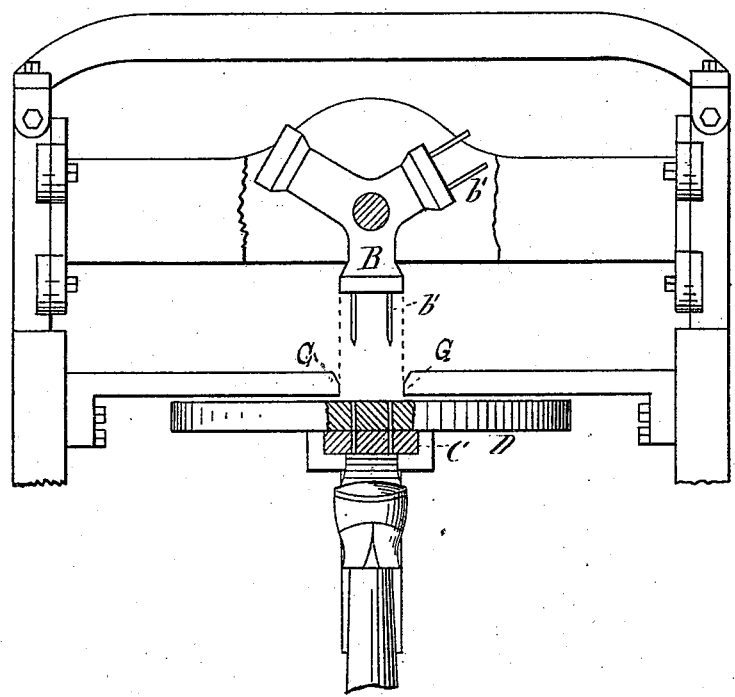
Figure 5:
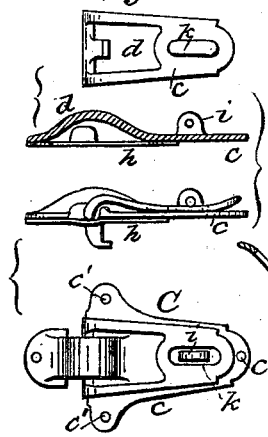
Figure 1:
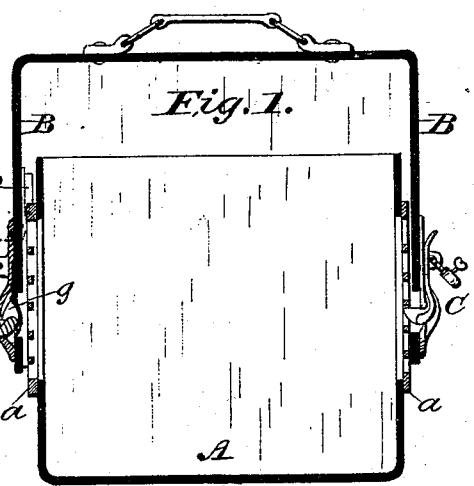
Figure 6:
Figure 7:
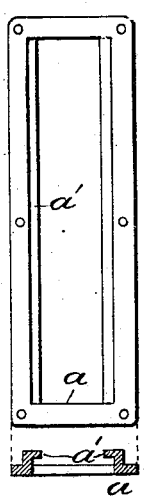
Figures 2, 3, 4:
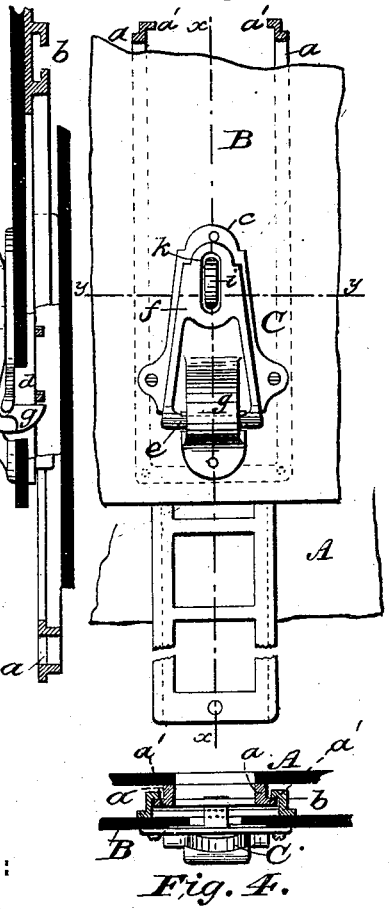
Figure 8:
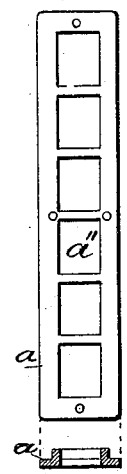
Figure 9:
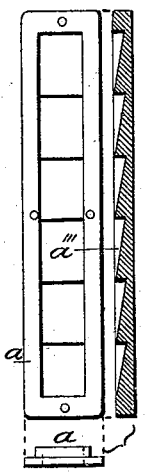
Figure 10:
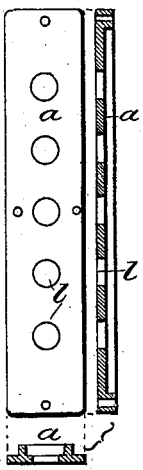

Figure 1 is a view in side elevation and vertical longitudinal section of the upper portion of a machine containing my invention. Fig. 2 is a rear elevation view of my invention. Fig. 3 is a plan view thereof. Fig. 4 shows the nail-holder plate and means for revolving it in enlarged side elevation. Fig. 5 shows the templet latching and unlatching mechanism in plan. Figs. 6, 7, and 8 illustrate, in elevation, plan, and vertical section, a modification. Fig. 9 shows in plan, and Fig. 10 in vertical section, means for automatically reciprocating the nail-holder plate upon the templet-plate and means for revolving it when so moved. Figs. 11, 12, 13, and 14 show details of construction.

The invention is an improvement upon those described in Letters Patent Nos. 252,215 and 259,687, both granted to Henry A. Henderson, assignor; and it consists, first, in providing the gang of awls, the gang of drivers, and the spanker, or any two of them, with automatic movements, whereby they may be automatically and successively brought into operative position; second, in the combination of said automatically-moved gangs of awls and drivers and the spanker, or either of them, with a templet moved automatically into and out of operative position, and also with a nail holder or feeding device moved automatically into and out of operative position; also, in various details of construction, all of which will hereinafter be fully described.

Referring to the drawings, A is the cross-head, which is adapted to be reciprocated by the mechanism described in said patents, or in any other suitable way; and in the drawings I have represented the same mechanism for providing the reciprocatory movements as that described in said Letters Patent No. 259,687.

The cross-head carries or supports the revolving head B, which is substantially like that described in said Patent No. 252,215, and supports the gang of awls $b$, the gang of drivers $b'$, and the spanker $b^2$, or any two of them. Upon the rear end of the shaft $b^3$, to which the head B is keyed, is the gear-wheel $b^4$. This gear-wheel is revolved either directly (or by means of an intermediate gear-wheel, $b^5$, carried by the cross-head A) by the worm $b^6$, which meshes with or engages the gear-wheel $b^5$ or $b^4$. The worm $b^6$ is revolved by the vertical shaft $b^7$, the bevel-gear $b^8$ at the lower end of the shaft, and the segment-gear $b^9$ on the cross-shaft $b^{10}$. This gearing is so proportioned as to move the revolving head B a portion of a revolution upon each reciprocation of the cross-head, and the extent, of course, of this revolution will depend upon the number of operations to which the heel is subjected. For instance, if the heel-blank is to be pricked, compressed, nailed, and the top-lift spanked on, then, if the arms supporting the awls, drivers, and top-lift spanker are equidistant apart, the head B must have a third of a revolution for each full movement of the cross-head. If the drivers and spanker only are used, then half a revolution must be provided the revolving head.

As the movement of the awls and drivers must be absolutely vertical during the lower portion of the reciprocation of the cross-head, it is necessary that the revolving movement should be provided the head B during the upper portion of its reciprocation. In other words, the awls or drivers must be brought into position over the templet or nail-holder and then moved vertically to bring them successively into operation, and therefore the head B must be revolved sufficiently to move either the awls, drivers, or spanker from an inoperative to an operative position during the first half of the reciprocation of the cross-head. To accomplish this I use the segment-gear C', substantially as shown in plan in Fig. 13.

During about one-half the revolution of the shaft $b^7$, the worm $b^6$ is stationary and the teeth of the segment-gear mesh with the teeth of the gear $b^9$ only during the upper portion of the reciprocating movement of the cross-head, or until the awls, drivers, or spanker are brought into operative position. As the worm $b^6$ is attached to the cross-head, it is necessary that provision be made for permitting the vertical movement of the worm in relation to the gears $b^8$ $b^9$, and this is accomplished by making the shaft $b^7$ in two parts, $b^{11}$ $b^{12}$, the part $b^{11}$ moving vertically in the hole in the part $b^{12}$. The rod $b^7$ may, however, be made in one piece and move vertically in the bevel-gear $b^8$.

The templet-plate C, I prefer to support upon or by a vertically-movable table, $c$, which is like that described in the application of Henry A. Henderson, filed January 10, 1883. This templet-plate I make somewhat wider than the templet therein described, and upon it is pivoted a circular nail-holder plate, D. This nail-holder plate is adapted to be revolved upon the center $d$, as hereinafter specified. It has formed about its edge any desirable number of nail-holders, D′, which may consist of holes drilled through the plate for the reception of nails, the holes being arranged in any desirable form; or the plate may have recesses for the reception of independent nail-holding blocks, which are fastened thereto by screws, or in any desirable way.

Each nail-holder may have a modification of the sliding or revolving bottom plate, such as described in said Henderson application and hereinafter specified. In the drawings I have represented, in Fig. 3, the solid nail-holder plate.

Figure 11:
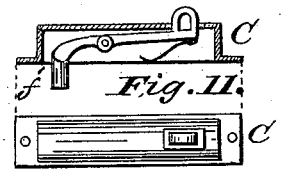

In Figs. 11 and 12 I show the revolving bottom of a nail-holder, D′, and means for automatically operating it to open and close the holes in the nail-holder, consisting of the arm $x$, attached to or forming a part of the bottom, the stop $x'$, projecting upwardly from the templet-plate, and the spring $x^2$. Upon the revolution of plate D, the arm $x$ comes in contact with the stop $x'$, and is held by it until the holes in the bottom register with the holes in the nail-holder block D′, and upon the continued movement of plate D the end of arm $x$ clears the stop, and the spring $x^2$ then draws it to its original position. It will be observed that by means of this nail-holder plate D a series of nail-holders are brought successively over the templet and by a very limited extent of movement of the plate. This facilitates the operation of the machine, as the attendant can load the nail-holders sufficiently far in advance of the work to cause no delay in feeding the nails.

While the nail-holder plate D may be revolved by hand, I prefer to revolve it automatically, and I have shown in Figs. 1, 2, 3, and 4 mechanism for doing this, consisting of the rod or shaft $d'$, to which the nail-holder plate D is keyed or secured, and which is supported by the templet-plate C and the barrel or sleeve $d^2$, secured to the shaft $d'$, and having projecting up and down teeth, which are preferably straight upon the back and inclined upon the front to the straight section or edge, as shown in Fig. 4.

Projecting from the cross-head is the arm $d^4$, which supports the arm $d^5$, having a bent end. The upper of these arms, it will be observed, upon the downward movement of the cross-head A, comes in contact with one of the inclines $d^3$ on the teeth projecting upwardly from the sleeve $d^2$, and, riding down the same, causes the shaft $d'$ to be partially revolved, and at the same time brings the incline of a downwardly-projecting tooth in position, so that the lower arm, $d^5$, upon the upward movement of the cross-head, comes in contact with it, and also causes the revolution of the shaft $d'$. In order that this movement may take place during the upper portion of the movement of the cross-head, and that the nail-holder may register with the templet during the lower portion of the movement, I have formed in the barrel or sleeve $d^2$, at the end of the inclines $d^3$, the vertical recesses $d^6$, so that the upper arm, $d^4$, upon reaching the end of an incline, shall continue to descend in the vertical recess $d^6$, and lock the nail-holder plate stationary during the remainder of the downward movement.

When a heel-spanker is employed, and for other reasons, it is desirable that the templet and nail-holder be moved out of operative position over the heel-support after the nails have been driven, and the proper movements for this purpose may be given the templet-plate by means of the segment bevel-gear $c'$ upon the shaft $b^{10}$, which meshes with the bevel-gear $c^2$ at the lower end of the connecting-shaft $c^3$. This shaft $c^3$ gives revolution to the short horizontal shaft $c^4$ by means of the bevel-gear $c^5$ $c^6$, and the horizontal shaft $c^4$ has a bevel-gear, $c^7$, which engages with the bevel-gear $c^8$ on the lower end of the vertical shaft $c^9$. This vertical shaft carries at its upper end a worm, $c^{10}$, which engages with the gear $c^{11}$. This gear has upon its face the pin $c^{12}$, which supports the connecting-rod $c^{13}$. This connecting-rod has in its outer end the slot $c^{14}$, and is secured to the templet-plate C by the stud $c^{15}$, which passes through the slot.

It will be seen that upon the revolution of the bevel-gear $c^2$ the templet-plate will be pushed into operative position by the connecting-rod $c^{13}$. As, however, when the heel is pricked, the templet-plate remains in position during two reciprocations of the cross-head, it is necessary that the same should be withdrawn by different mechanism from that moving it into position; and as the gear $c^{11}$ continues to revolve, and as the templet has also a vertical movement, it is necessary that the connecting-rod $c^{13}$ should have the slot $c^{14}$, so that said movements can take place without affecting the operation of the machine. The templet, therefore, when pushed outward by the rod $c^{12}$, is locked into position by means of the latch $c^{16}$, which is attached to the side of the table $c'$, and has a cone-shaped plug, $c^{17}$, which enters a hole in the table and in the templet-plate.

The latch $c^{16}$ should be a spring-latch, in order to automatically push the plug into the hole in the templet-plate when it comes in line therewith. Consequently the templet-moving the nail-holder and feeding the nails, as any mechanical equivalent therefor may be employed. Neither do I confine the use of the invention to a machine having a templet movable either vertically or vertically and horizontally, as a stationary templet can be used, if desired, in which case the jack can be lifted automatically against the templet-plate to compress the heel-blank.

Of course it is obvious that by this construction a considerable saving in time in nailing is accomplished.

The segment-gear $c'$ should be of such size and shape that the templet-plate is moved from its operative position immediately after the withdrawal of the drivers therefrom on their upward movement, and held in its inoperative position during the lower half of the reciprocation of the spanker, and as soon as the spanker has passed the upper level of the plate on its upward movement the templet is returned.

The rods connecting the upper cross-head A with the lower one (not shown) are like those described in said Henderson patent.

Having thus fully described my invention, I claim and desire to secure by Letters Patent of the United States—

1. In an organized heel-nailing machine, the combination of the reciprocating cross-head or support A with a gang or group of awls and a gang or group of drivers, and means, substantially as specified, for automatically moving them successively into and out of operative position, all substantially as and for the purposes described.

2. In an organized heel-nailing machine, the combination of the reciprocating cross-head or support A, a gang or group of awls, a gang or group of drivers, and a heel-spanker, and means, substantially as specified, for automatically moving the awls, drivers, and spanker into and out of operative position, all substantially as and for the purposes described.

3. In an organized heel-nailing machine, the combination of the reciprocating cross-head or support A, a gang of drivers, and a heel-spanker, and means, substantially as specified, for automatically moving them successively into operative position upon the cross-head or support, all substantially as and for the purpose set forth.

4. In an organized heel-nailing machine, the combination of a reciprocating cross-head with a gang or group of awls adapted to be moved thereon automatically, by means substantially as specified, into and out of operative position over the heel-support or work, all substantially as and for the purposes described.

5. In an organized heel-nailing machine, the combination of a support for the boot or shoe, a templet, C, moved automatically into and out of operative position by means substantially as specified, a reciprocating gang of awls, and a reciprocating gang of drivers, adapted to be automatically and successively brought into position over the templet by means substantially as set forth, all substantially as and for the purposes described.

6. In an organized heel-nailing machine, the combination of a support for the boot or shoe, the templet C, moved automatically, by means substantially as specified, into and out of operative position, a reciprocating gang of drivers, and a reciprocating heel-spanker, adapted to be automatically and successively brought into operative position by means substantially as set forth, all substantially as and for the purposes described.

7. The combination, in an organized heel-nailing machine, of a support for the boot or shoe, a templet, C, an automatic revolving nail-feeding device for feeding nails into position to be driven, and a reciprocating gang of drivers, all combined and arranged substantially as and for the purposes described.

8. In an organized heel-nailing machine, the combination of a support for the boot or shoe, a templet, C, an automatic nail-feeding device, substantially as shown, for feeding nails into position to be driven, a reciprocating gang of awls, and a reciprocating gang of drivers, adapted to be moved automatically and successively into operative position, all combined to operate substantially as and for the purposes described.

9. The combination, in an organized heel-nailing machine, of a support for the boot or shoe, a vertically-movable templet, an automatic nail-feeding device for feeding nails into position to be driven, and a reciprocating gang of drivers, all combined to operate substantially as and for the purposes described.

10. In an organized heel-nailing machine, the combination of a support for the boot or shoe, a templet, C, moved automatically into and out of operative position, and a series of nail holders or feeders moved automatically and successively into operative position, all substantially as and for the purposes described.

11. In a heel-nailing machine, the combination of a templet with a series of nail-holders adapted to be moved successively into operative position over the templet, all substantially as and for the purposes described.

12. In a heel-nailing machine, the nail-feeding device, consisting of the plate D, having a series of nail-holders, D', arranged therein or supported thereby, all substantially as and for the purposes described.

13. In an organized heel-nailing machine, in combination, with the nail-driving mechanism, the sliding plate or carriage $m^3$, supporting the revolving plate $m^2$, which carries or supports two or more heel-supports or jacks, $m$ $m'$, all substantially as and for the purposes described.

14. In a heel-nailing machine, the combination of the reciprocating cross-head A, the revolving head B, supporting the awls, drivers, and spanker, with the shaft $b^{10}$ and the intermediate connecting mechanism described, all substantially as and for the purposes described.

15. The combination of the templet C, the shaft $b^{10}$, and the intermediate connecting mechanism described, all substantially as and for the purposes set forth.

16. The combination of the cross-head A, the nail-holder plate D, and intermediate mechanism, substantially as described, whereby the reciprocation of the cross-head revolves the said plate, all substantially as and for the purposes described.

17. The combination of the templet-plate C, the nail-holder plate D, pivoted thereto, the connecting-rod $c^{13}$, operated to move the templet horizontally, the spring $c^{18}$, the latch $c^{16}$, and the unlatching device E, adapted to be automatically operated, all substantially as and for the purposes described.

18. The combination of the main shaft of the machine, the cross-head A, the templet C, and nail-holder plate D, and connecting mechanism, substantially as specified, whereby upon the revolution of the shaft the cross-head is reciprocated and the templet and nail-feeding devices automatically moved into and out of operative position, all substantially as and for the purposes described.

19. The combination of the main shaft of the machine, the cross-head A, supporting a gang or group of awls, a gang or group of drivers and a spanker, and templet C, a nail-feeding device, and connecting mechanism, substantially as specified, whereby upon the revolution of the shaft the awls, drivers, and spanker are reciprocated and brought automatically and successively into operative position and the templet and nail-holder automatically moved into and out of operative position, all substantially as and for the purposes described.

20. The combination of the main shaft, the cross-head A, the templet C, and nail-holder D', and connecting mechanism, substantially as specified, with a stop-motion mechanism, substantially as described, for automatically stopping the machine at the end of the second or third reciprocation of the cross-head, all substantially as and for the purposes described.

21. The combination of the templet, its locking mechanism or latch, and mechanism described for automatically unlatching the same, all substantially as and for the purposes described.

22. The combination of the table adapted to be moved vertically, its latch or lock, and means for automatically unlatching or unlocking the same, all substantially as and for the purposes described.

23. The combination of the nail-holder D', its revolving bottom, having the arm $x$, spring $x^2$, and the stop $x'$, all substantially as and for the purposes described.

24. In a heel-nailing machine, the combination of the reciprocating cross-head A, the gang of awls, gang of drivers, and spanker, or any two of them, and means, substantially as specified, for moving said devices, or any two of them, upon the cross-head during the upper portion of the reciprocating movement of the head, all substantially as and for the purposes described.

25. The combination, in a heel-nailing machine, of the reciprocating cross-head, the gang of awls, gang of drivers, and spanker, or any two of said devices, adapted to be moved into and out of operative position on the head by the worm $b^6$, the shaft $b^{10}$, and mechanism as specified, all substantially as and for the purposes described.

26. The combination of the reciprocating cross-head, the movable awl, driver, or spanker-block supported thereon, with the centering-guider G, all substantially as and for the purposes described.

F. F. RAYMOND, 2D.

Witnesses:
FRED. HARRIS,
WILLIAM J. MEALEY.

(No Model.) 2 Sheets—Sheet 1.

W. REETZ.
EXTENSION CASE OR BOX.

No. 287,473. Patented Oct. 30, 1883.

WITNESSES:
L. F. Keleher.
A. Gateau.

INVENTOR
William Reetz,
BY T. C. Brecht
ATTORNEY